(12) United States Patent
Edwards

(10) Patent No.: US 10,900,394 B2
(45) Date of Patent: Jan. 26, 2021

(54) GREASE DELIVERY SYSTEM

(71) Applicants: NCH CORPORATION, Irving, TX (US); Jason Edwards, Heath, TX (US)

(72) Inventor: Jason Edwards, Heath, TX (US)

(73) Assignee: NCH CORPORATION, Irving, TX (US)

( * ) Notice: Subject to any disclaimer, the term of this patent is extended or adjusted under 35 U.S.C. 154(b) by 95 days.

(21) Appl. No.: 15/566,004

(22) PCT Filed: Dec. 15, 2015

(86) PCT No.: PCT/US2015/065820
§ 371 (c)(1),
(2) Date: Oct. 12, 2017

(87) PCT Pub. No.: WO2016/100341
PCT Pub. Date: Jun. 23, 2016

(65) Prior Publication Data
US 2018/0112565 A1    Apr. 26, 2018

Related U.S. Application Data

(60) Provisional application No. 62/092,064, filed on Dec. 15, 2014.

(51) Int. Cl.
*F01M 11/04* (2006.01)
*F16N 37/00* (2006.01)
(Continued)

(52) U.S. Cl.
CPC ........... *F01M 11/0458* (2013.01); *B67D 7/04* (2013.01); *B67D 7/42* (2013.01); *B67D 7/58* (2013.01);
(Continued)

(58) Field of Classification Search
CPC .... B67D 7/58; B67D 7/68; B67D 7/78; F16N 37/00; F01M 11/0458
(Continued)

(56) References Cited

U.S. PATENT DOCUMENTS 2,807,960 A * 10/1957 Schweitzer ............. G01F 23/58
73/322
2,979,949 A *  4/1961 Counts .................... G01F 23/34
73/317

(Continued)

FOREIGN PATENT DOCUMENTS

EP        2607611 A1    6/2013
KR   20100099835 A      9/2010
(Continued)

OTHER PUBLICATIONS http://machinedesign.com/mechanical-drives/lubrication-tips-plastic-gears-and-more; Obtained Dec. 14, 2014.
(Continued)

*Primary Examiner* — Timothy L Maust
(74) *Attorney, Agent, or Firm* — Ramey & Schwaller, LLP; William P. Ramey; Melissa D. Schwaller

(57) ABSTRACT

A grease delivery system is provided which includes refilling containers with a fluid from a larger reservoir to eliminate excess cost and waste. The container and reservoir are connected using hoses, a pump, and quick connect couplings. The containers are used to provide equipment with the fluid.

18 Claims, 5 Drawing Sheets

(51) Int. Cl.
*F17C 5/02* (2006.01)
*B67D 7/04* (2010.01)
*B67D 7/42* (2010.01)
*B67D 7/58* (2010.01)
*B67D 7/78* (2010.01)

(52) U.S. Cl.
CPC .............. *B67D 7/78* (2013.01); *F16N 37/00* (2013.01); *F17C 5/02* (2013.01); *F17C 2201/056* (2013.01); *F17C 2201/058* (2013.01); *F17C 2205/037* (2013.01); *F17C 2205/0364* (2013.01); *F17C 2221/033* (2013.01); *F17C 2223/0161* (2013.01); *F17C 2223/033* (2013.01); *F17C 2225/0161* (2013.01); *F17C 2225/033* (2013.01); *F17C 2227/0135* (2013.01)

(58) Field of Classification Search
USPC .................................................. 141/192, 382
See application file for complete search history.

(56) References Cited

U.S. PATENT DOCUMENTS

| | | | | |
|---|---|---|---|---|
| 3,159,180 | A * | 12/1964 | Courtot ................. | F16L 37/113 137/614.06 |
| 3,920,056 | A | 11/1975 | Piecuch | |
| 4,195,672 | A * | 4/1980 | Freeman ............. | A01M 7/0092 141/231 |
| 4,239,184 | A * | 12/1980 | Dudar .................... | B60C 29/06 137/231 |
| 4,420,023 | A | 12/1983 | Cislak | |
| 4,481,977 | A * | 11/1984 | Maldavs ................. | F16L 35/00 138/89.4 |
| 4,485,831 | A * | 12/1984 | Ungerleider ........ | A47J 37/1271 137/1 |
| 4,572,120 | A | 2/1986 | Matsumoto | |
| 4,646,793 | A * | 3/1987 | Sherratt .............. | A47J 37/1271 137/358 |
| 4,741,368 | A * | 5/1988 | Crumby .............. | A01M 7/0085 137/587 |
| 5,230,374 | A * | 7/1993 | Dawson .................. | B62B 1/264 141/18 |
| 5,570,813 | A | 11/1996 | Clark, II | |
| 5,607,000 | A * | 3/1997 | Cripe .................... | B67D 7/0272 137/205 |
| 5,878,767 | A | 3/1999 | Etling et al. | |
| 5,964,258 | A * | 10/1999 | Schoenbauer ...... | A47J 37/1223 141/231 |
| 6,378,657 | B2 * | 4/2002 | Viken .................... | F01M 11/04 141/114 |
| 6,637,725 | B2 * | 10/2003 | Davis .................. | B67D 1/0835 137/269 |
| 2007/0012375 | A1 | 1/2007 | Fannon, III et al. | |
| 2013/0256062 | A1 | 10/2013 | Kotyk et al. | |

FOREIGN PATENT DOCUMENTS

| | | | | |
|---|---|---|---|---|
| KR | 2017051559 | * | 5/2017 | ............. F16N 37/00 |
| RU | 62104 U1 | | 3/2007 | |
| RU | 69611 U1 | | 12/2007 | |
| WO | 9300290 A1 | | 1/1993 | |

OTHER PUBLICATIONS

Machinery Lubrication: How to Identify Different Types of Grease; http://www.machinerylubrication.com/Read/29062/_different-grease-types; Obtained Aug. 10, 2018 (copy of material originally obtained Dec. 14, 2014, is not available).
http://www.reliabilityweb.com/art04/understanding_the_basics_of_grease.pdf; Obtained Dec. 14, 2014.
http://www.lube-tips.com/focus/2008_11_12.htm; Obtained Dec. 14, 2014.
Extended European Search Report dated Dec. 19, 2017, in European Application No. 15870873.5.
International Preliminary Report on Patentability dated Jun. 29, 2017, in International Application No. PCT/US15/65820
International Search Report and Written Opinion dated Mar. 31, 2016, in International Application No. PCT/US15/65820.
http://shop.hoseandfittings.com/catalog/Coupler/Hydraulic_Coupler.html; Obtained Dec. 14, 2014.
American Lubrication Equipment Corporation; Lubrication Equipment Catalog; ; 2011.
Lincoln; Portable Equipment High-Pressure Heavy-Duty Grease Pumps; pp. 80-85.
Lubromation; Refilling Quicklube Reservoirs.
Mantek; Lubra systems division; Elite Multi-Purpose, Heavy Load, Extreme Pressure, High Temperature Grease; 2010; NCH Corporation.
Mantek; Advanced Technology Lubrication; 2013; NCH Corporation; Dallas, Texas.
European Examination Report dated Aug. 23, 2019 for related European Patent Application No. 15870873.5.

* cited by examiner

GREASE DELIVERY SYSTEM

CROSS-REFERENCE TO RELATED APPLICATIONS

This application is a National Stage of International Application No. PCT/US15/065820, filed Dec. 15, 2015; which claims the benefit of U.S. Provisional Application No. 62/092,064, filed Dec. 15, 2014; the entirety of which are incorporated herein by reference.

FIELD

The disclosure relates generally to storage and delivery of fluids. Specifically, this disclosure relates to systems for grease delivery.

BACKGROUND

Problems for large grease consuming customers are disposal of empty grease containers, the time involved changing out grease containers, and pump failure from contamination incurred during the change out process.

It would therefore be advantageous to have a grease delivery system that reuses grease containers and prevents pumps from contamination.

SUMMARY

An embodiment of the disclosure is a system for fluid delivery comprising a fluid; a refillable reservoir for storing the fluid; a refillable reservoir outlet; a refillable reservoir outlet coupling; a pump for moving the fluid; a pump hose for conveying the fluid; a pump hose quick connect; a refillable container for receiving the fluid; a refillable container port; a refillable container quick connect attached to the refillable container inlet; and a pump hose coupling for attaching the pump hose to the refillable container quick connect. In an embodiment, the fluid is grease. In an embodiment, the fluid is oil. In an embodiment, the fluid is liquid natural gas. In an embodiment, the fluid is a chemical. In another embodiment, the reservoir is a tote. In an embodiment, the refillable container is a drum. In another embodiment, the refillable container is a keg. In yet another embodiment, the refillable container quick connect is a ¾ inch male hydraulic quick connect. In an embodiment, the pump is dedicated to the system. In an embodiment, the pump is a quick transfer pump. In another embodiment, the refillable reservoir and the refillable container are in fluid communication. In an embodiment, the pump hose quick connect comprises a valve. In yet another embodiment, the hose quick connect is a ¾ inch female hydraulic quick connect. In an embodiment, the valve is a ½ turn ball valve. In an embodiment, the refillable container port receives a fluid. In an embodiment, the fluid the port receives is selected from the group consisting of grease, oil, liquid natural gas, and a chemical. In an embodiment, the refillable container port provides a fluid. In an embodiment, the fluid the port provides is selected from the group consisting of grease, oil, liquid natural gas, and a chemical. In another embodiment, the refillable container port is covered with a dust cover when not engaged with a quick connect.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

Figure 1:
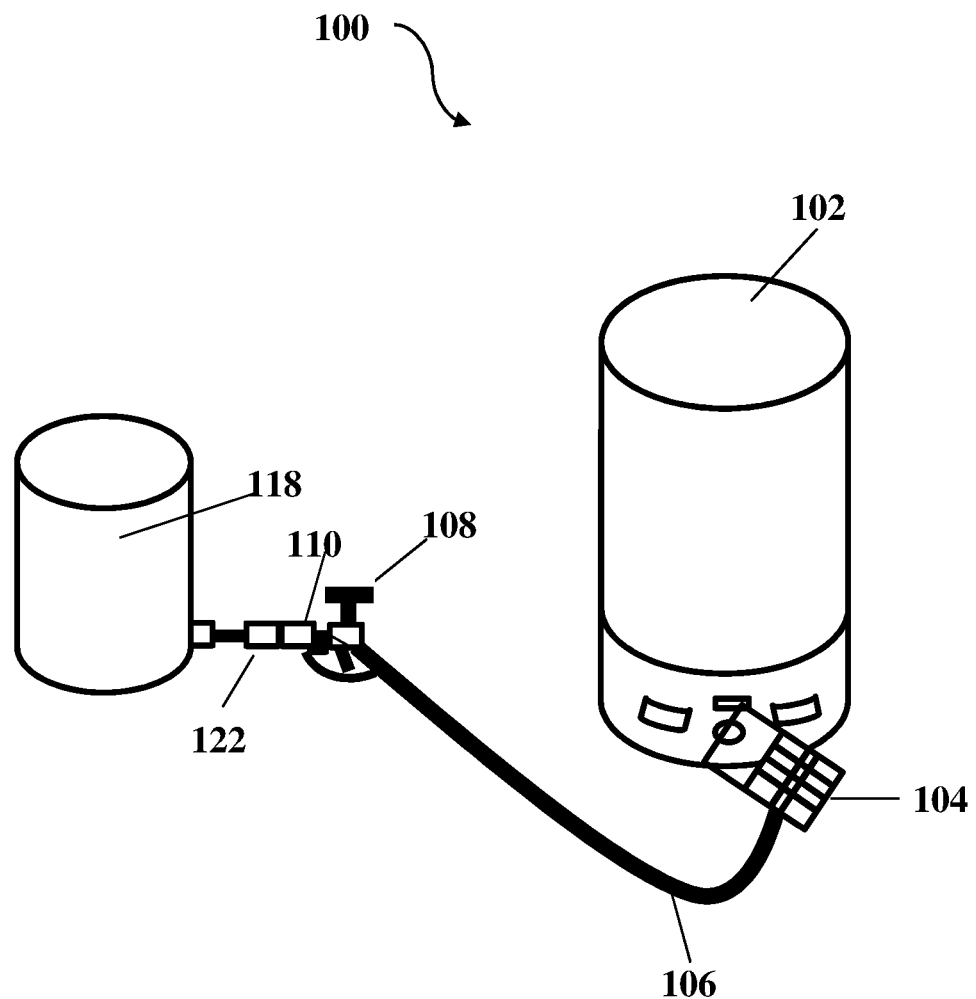
FIG. 1 depicts a view of the grease delivery system.

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure can be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

As used herein, the term "quick connect" means and refers to a coupling that allows for attachment to another coupling without the use of tools. A quick connect is able to attach to various other couplings. The quick connect can be of any configuration that allows attachment to at least a coupling on a pump hose.

As used herein, the term "tote" means and refers to container that stores a fluid. In an embodiment, it is used as a reservoir from which to refill other containers. A tote can be made of including but not limited to plastic or metal. In an embodiment, the plastic can be polyethylene, polypropylene, polyvinyl chloride, polyurethane, or a copolymer thereof. Some greases are not compatible with plastics, such as greases based on esters or polyglycols. (Available at http://machinedesign.com/mechanical-drives/lubrication-tips-plastic-gears-and-more, last visited Dec. 14, 2014). In an embodiment, a tote can contain 2700 pounds of grease.

As used herein, the term "drum" means and refers to a container that stores a fluid. In an embodiment, it is filled from another container. A drum can be made of including but not limited to plastic or a metal such as steel. In an embodiment, the plastic can be polyethylene, polypropylene, polyvinyl chloride, polyurethane, or a copolymer thereof. In an embodiment, a drum can contain 400 pounds of grease.

As used herein, the term "keg" means and refers to a container that stores a fluid. In an embodiment, it is filled from another container. A keg can be made of including but not limited to plastic or a metal such as steel. In an embodiment, the plastic can be polyethylene, polypropylene, polyvinyl chloride, polyurethane, or a copolymer thereof. In an embodiment, a keg can contain 120 pounds of grease.

As used herein, the term "port" means and refers to an opening for intake or release of a fluid.

The fluid delivered can be selected from the group including but not limited to grease, oil, water, liquid natural gas, brake fluid, hydraulic fluid, chemicals, and biolubricant. In an embodiment, any type of grease can be used as long as it is capable of being pumped into another container. In an embodiment, grease to be delivered can be comprised of the following: a fatty material, base, and fluid. (Machinery Lubrication: How to Identify Different Types of Grease, available at http://www.machinerylubrication.com/Read/29062/different-grease-types, last visited on Dec. 14, 2014). A grease can also be comprised of a complexing salt. In an embodiment, a grease can also be comprised of lithium, aluminum, calcium, and barium. These components improve heat resistance of the grease. In an embodiment, the grease type can be selected from the following, "mixtures of mineral oils and solid materials, heavy, asphaltic-type oils blended with lighter oils, extreme pressure greases, roll-neck greases, soap-thickened mineral oils, and multi-purpose grease". (Available at http://www.reliabilityweb.com/art04/understanding_the_basics_of_grease.pdf, last visited Dec. 14, 2014). In an embodiment, the grease can be an aluminum complex grease. In another embodiment, the grease can be a calcium sulfonate grease. In an embodiment, the grease can be a synthetic blend. In an embodiment, the grease can be a calcium 12 hydroxy stearate grease. In an embodiment, the grease can be a lithium grease. Various viscosities of grease can be used in the grease delivery system. Any grease can be used in the grease delivery systems as long as it can be drawn into a pump.

The present disclosure provides a solution to at least three issues for grease consuming customers: disposal of empty grease containers, time involved changing out grease containers, and pump failure from contamination that occurs during the change out process.

In an embodiment, refillable, standard size, grease containers are equipped with a built-in hydraulic quick connect mounted on the bottom of the container. This changes the manner in which grease is delivered as well as eliminating waste drums or kegs. When the refillable container is nearing empty or empty, grease is added to the refillable container as part of the grease delivery system. The refillable kegs or drums are refilled from a larger bulk container. The large bulk containers (totes) are not disposed of, but instead sent back to be cleaned and refilled for future use. The customer then only uses refillable containers, thus eliminating waste grease containers. Currently, customers are charged $200-500 per container to dispose of the waste grease containers. The elimination of the need to dispose of waste containers saves the customer money and is better for the environment.

The grease delivery system provides cost savings to customers. Purchasing grease in a large volume, such as a tote, is less expensive than buying the grease in drums. Reuse of the drums removes the need to buy new drums. In an embodiment, the totes are sent back to the grease provider, cleaned and reused.

In an embodiment, the hose is a hydraulic hose and is selected from the following, wire spiraled reinforced, wire braided reinforced, and textile reinforced. The hose can be any diameter suitable for delivery of the grease.

In an embodiment, the pump can be used with the refillable container to provide grease to the equipment in need of lubrication.

The system utilizes quick connects. This allows the customer to rapidly switch from refilling reusable containers to being able to use a dedicated pump for standard grease pumping usage. This reduces the number of pumping systems required during daily operations. In an embodiment, the pump that is used to pump grease from the reservoir to the container is also used to pump grease from the container to the structure used to apply the grease to the equipment in need of grease. In an embodiment, the structure is a grease gun. In an embodiment, the pump is protected from outside contamination by hoses with quick connect couplings. Refilling the containers eliminates the need to remove the pump from the containers. Contamination of a grease delivery system can introduce contaminates to the equipment on which the grease is being used. (Available at http://www.lube-tips.com/focus/2008_11_12.htm, last visited Dec. 14, 2014) In an embodiment, the contaminants can cause abrasion in the equipment. Without the pump being removed from the system the pump is no longer exposed to outside contamination, dramatically reducing pump failures. In an embodiment, hydraulic quick connects can be an agricultural interchange, diagnostic interchange, high pressure screw together, high pressure wing style, flush face, or wing style. In an embodiment, the quick connects can be male or female. In an embodiment, the quick connects can be made of steel, brass, aluminum, or stainless steel. In an embodiment, the hose connection is a female NPT, male NPT, hose barb, or push on hose barb. In an embodiment, the barb size is ½ inch, ¼ inch, ⅜ inch, 5/16 inch, 1/32 inch, or 3/64 inch. In an embodiment, the body size is ½ inch, ¼ inch, or ⅜ inch. In an embodiment, the pipe size is selected from the following sizes, ½ inch, ¼ inch, ⅛ inch, ¾ inch, or ⅜ inch. In an embodiment, the maximum flow is 10, 22, 35, 38, 42, 41, 45, 46, 50, 65, 70, 91, 97, 110, 120, or 250 cubic feet per minute (cfm).

In an embodiment, the drums containing grease are delivered to the work site on a truck. In an embodiment, 80-120 drums can be delivered. The drums are removed from the truck, often requiring a fork lift. This takes time and effort. It is more efficient to have the grease delivered in totes and refill the drums on site.

In an embodiment, a pop-up indicator is attached to the lid or pump lid to indicate a full container during the process of refilling. In an embodiment, the pop-up indicator is attached to the lid of the drum. In an embodiment, the pop-up indicator is attached to the lid of the keg.

In an embodiment, the grease is used for heavy equipment. In an embodiment, the grease is used for fracking equipment. In an embodiment, the grease is used for construction equipment. In an embodiment, the grease is used for food preparation.

FIG. 1 depicts a view of the grease delivery system 100. FIG. 1 depicts a tote 102 connected to a hose. The hose 106 is connected to the pump 104. The pump 104 is connected to another hose 106. The hose 106 has a coupling 110 that connects to a quick connect coupling 122 on the drum 118.

A valve 108 is present in the hose coupling 110 that allows the flow of grease to be turned on and off. In an embodiment, the valve 108 is selected from the valves including but not limited to a ball valve, gate valve, glove valve, needle valve, high pressure valve, butterfly valve, and poppet valve. In an embodiment, the quick connects are used with a ½ turn high pressure valve for compact size and durability.

Figure 2:
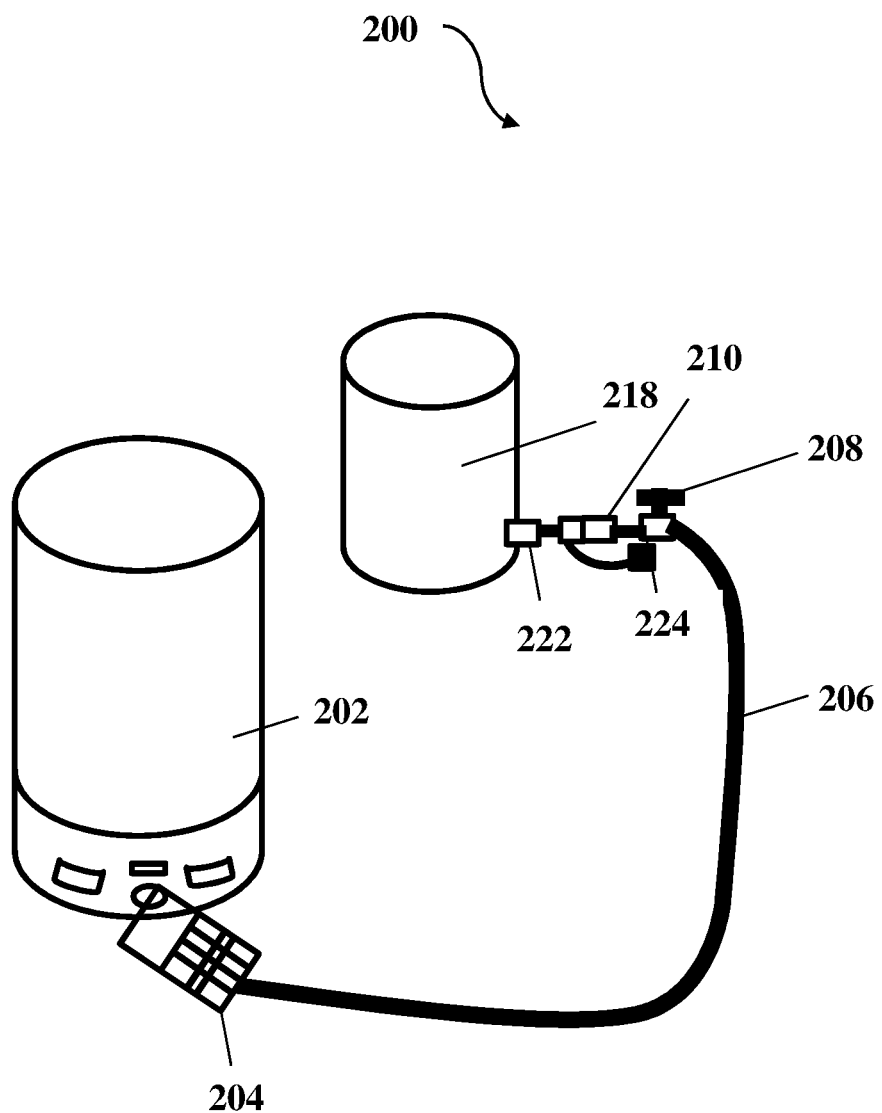
FIG. 2 depicts a view of the refillable container of the grease delivery system.

FIG. 2 depicts a view of the refillable container of the grease delivery system 200. FIG. 2 depicts a drum with a quick connect coupling connected to a hose coupling. The hose 206 is connected to the pump 204. The pump 204 is connected to another hose 206. The hose 206 has a coupling 210 that connects to a quick connect coupling 222 on the drum 218. A dust cover 224 is attached to the quick connect coupling 222. A valve 208 is present in the hose coupling 210 that allows the flow of grease to be turned on and off. In an embodiment, the valve 208 is selected from the valves including but not limited to a ball valve, gate valve, glove valve, needle valve, high pressure valve, butterfly valve, and poppet valve. In an embodiment, the quick connects 222 are used with a ½ turn high pressure valve 208 for compact size and durability.

Figure 3:
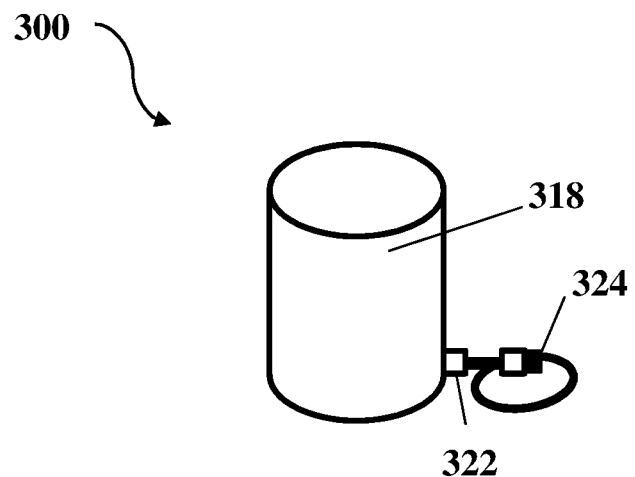
FIG. 3 depicts a view of a quick connect coupling on the refillable container of the grease delivery system.

FIG. 3 depicts a view of a drum 318 with a quick connect coupling 322 and a dust cover 324 of the grease delivery system 300. A dust cover 324 is present on the quick connect coupling 322.

Figure 4:
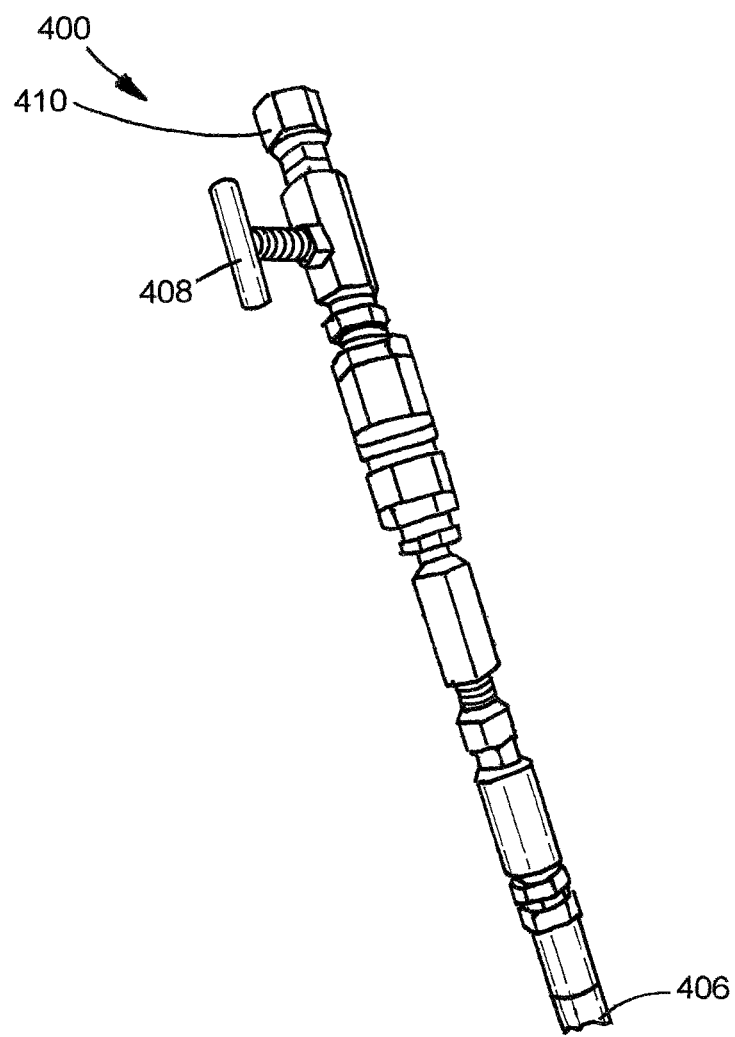
FIG. 4 depicts a view of couplings for connection to the quick connect coupling on the refillable container.

FIG. 4 depicts a view of couplings 400 for connection to the quick connect coupling on a refillable container. The hose 406 has a coupling 410 and a valve 408 is present in the hose coupling 410 that allows the flow of grease to be turned on and off.

Figure 5:
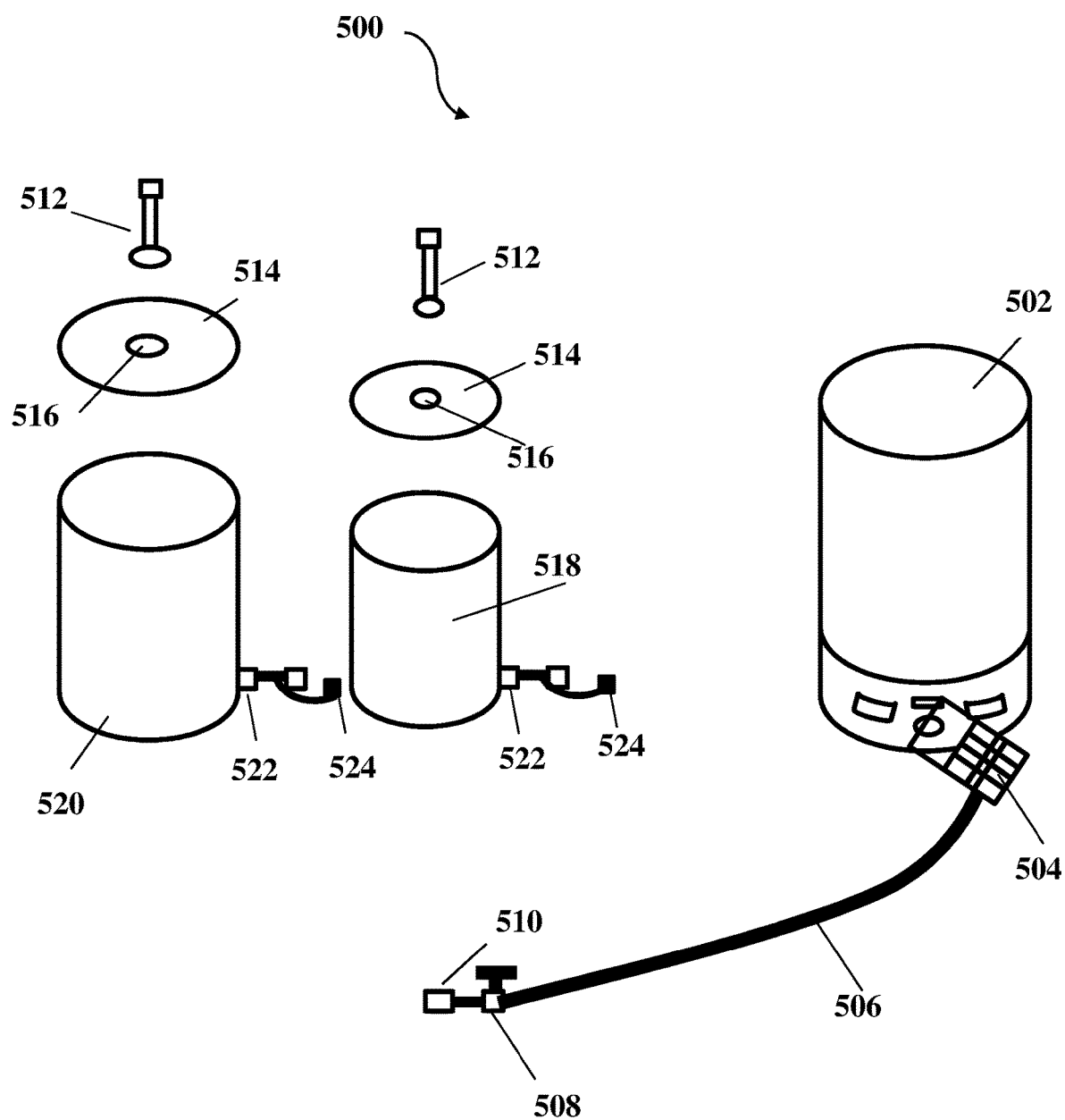
FIG. 5 depicts a view of grease delivery system.

FIG. 5 depicts a view of grease delivery system 500.

EXAMPLE

In an embodiment, a 2700 pound tote 502 containing grease will be delivered to a customer. Fig.5. In an embodiment, the tote 502 will be delivered to the customer and filled with grease at the customer's site. Empty drums will also initially be delivered to the customer. Three-quarter inch quick connect couplings 510 attached to hoses 506 will be used in conjunction with a quick transfer pump 504 to move grease from the tote 502 into the bottom of the 400 pound (drum) 520 or 120 pound grease (keg) 518 containers. The refillable and reusable drum 520 and keg 518 containers will have a pop-up fill indicator 512 attached to the lid 514 of the container. There is a hole 516 in the lid 514. A dust cover 524 will be present on the quick connect 522 at the port on the drum and keg. The quick connect 510 at the end of the hose 506 that attaches to the drum 520 or keg 518 will have a ¾ inch female hydraulic guide connect 510. The quick connect 510 on the hose 506 will be used with a high-pressure ½ turn ball valve 508. The quick connect 522 on the port of the drum 520 and keg 518 will have a ¾ inch male hydraulic quick connect 522. The lid 512 and pump 504 will be left intact and the pop-up indicator indicates a full container 520, 518.

The hose 506 and pump 504 connected to the tote 502 will be used in conjunction with a structure to provide grease to equipment in need of lubrication. In an embodiment, the structure will be a grease gun. When the tote 502 is empty or nearing empty, it will be picked up from the customer, cleaned, and reused by the provider. In an embodiment, the tote 502 will be refilled at the customer's site. In an embodiment, the tote 502 is refilled by a truck with a tank containing grease.

All of the compositions and methods disclosed and claimed herein can be made and executed without undue experimentation in light of the present disclosure. While the compositions and methods of this invention have been described in terms of preferred embodiments, it will be apparent to those of skill in the art that variations can be applied to the compositions and methods and in the steps or in the sequence of steps of the methods described herein without departing from the concept, spirit and scope of the invention. More specifically, it will be apparent that certain materials or structures which are related can be substituted for the materials or structures described herein while the same or similar results would be achieved. All such similar substitutes and modifications apparent to those skilled in the art are deemed to be within the spirit, scope and concept of the invention as defined by the appended claims.

What is claimed is:

1. A system for fluid delivery comprising:
a refillable reservoir configured for storing a fluid, the refillable reservoir including:
a refillable reservoir outlet; and,
a refillable reservoir outlet coupling;
a pump for moving the fluid;
a pump hose for conveying the fluid;
a pump hose coupling connected to the pump hose, the pump hose coupling including a pump hose quick connect and a valve; and,
at least one refillable container for receiving the fluid, the at least one refillable container including:
a refillable container inlet; and,
a pop-up indicator; and
a refillable container quick connect attached to the refillable container inlet, the refillable container quick connect being configured to be releasably coupled with the pump hose quick connect,
wherein the valve is separate from the pump hose quick connect, and
wherein each of the pump hose quick connect and the refillable container quick connect is a coupling that allows for attachment to another coupling without use of tools; the pump is able to move the fluid in the system from the refillable reservoir through the pump hose, the pump hose quick connect, and the refillable container quick connect to the refillable container.

2. The system of claim 1, wherein the fluid is one of a grease, an oil, a liquid natural gas, a chemical, and combinations thereof.

3. The system of claim 1, wherein the at least one refillable container is one of a drum and a keg.

4. The system of claim 1, wherein one of the pump hose quick connect and the refillable container quick connect is a ¾ inch male hydraulic quick connect.

5. The system of claim 1, wherein the pump is dedicated to the system.

6. The system of the claim 1, wherein the pump is a quick transfer pump.

7. The system of claim 1, wherein the refillable reservoir and the at least one refillable container are in fluid communication.

8. The system of claim 1, wherein one of the pump hose quick connect and the refillable container quick connect is a ¾ inch female hydraulic quick connect.

9. The system of claim 1, wherein the valve is one of a ball valve, a gate valve, a glove valve, a needle valve, a high pressure valve, a butterfly valve, a poppet valve, a ½ turn ball valve, and a ½ turn high pressure valve and the valve is separate from the pump hose quick connect.

10. The system of claim 1, wherein the refillable container inlet is configured to receive the fluid therethrough from the refillable container quick connect.

11. The system of claim 1, wherein the refillable reservoir outlet is configured to provide the fluid therethrough to the pump hose.

12. The system of claim 1, further comprising a dust cover configured to cover the refillable container quick connect when the refillable container quick connect is not engaged with the pump hose quick connect.

13. The system of claim 1, wherein at least one of the pump hose quick connect and the refillable container quick connect is one of an agricultural interchange, a diagnostic interchange, a high pressure screw together, a high pressure wing style, a flush face, and a wing style.

14. The system of claim 1, wherein at least one of the pump hose quick connect and the refillable container quick connect is one male and female.

15. The system of claim 1, wherein at least one of the pump hose quick connect and the refillable container quick connect is made of one of a steel, a brass, an aluminum, and a stainless steel.

16. The system of claim 1, wherein at least one of the pump hose quick connect and the refillable container quick connect is one of a female NPT, a male NPT, a hose barb, and a push-on hose barb.

17. The system of claim 1, wherein the pop-up indicator is attached to a lid of the at least one refillable container.

18. The system of claim 1, wherein the refillable container inlet is proximate a bottom of the at least one refillable container.

* * * * *